Sept. 9, 1958 A. KINKEAD 2,851,288
TELESCOPIC WALL FLUE CONNECTION WITH LOCKING RING
Filed Sept. 4, 1956 6 Sheets-Sheet 1
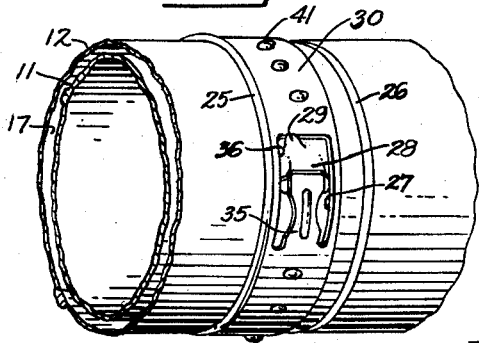
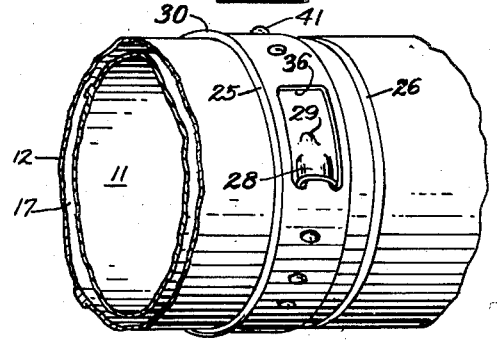
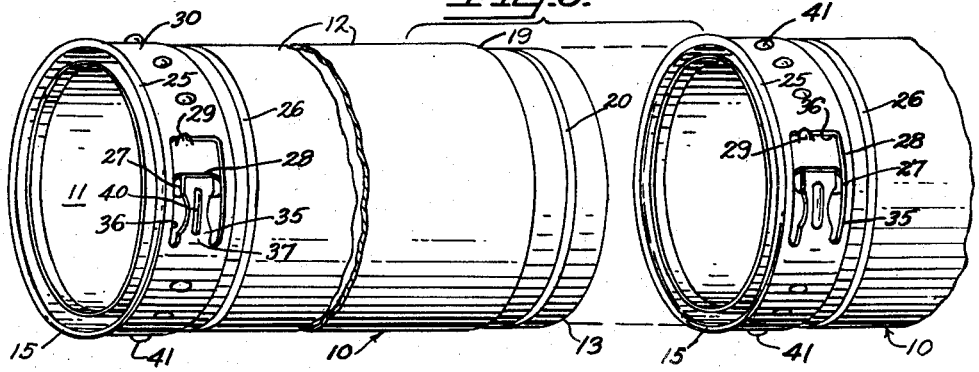
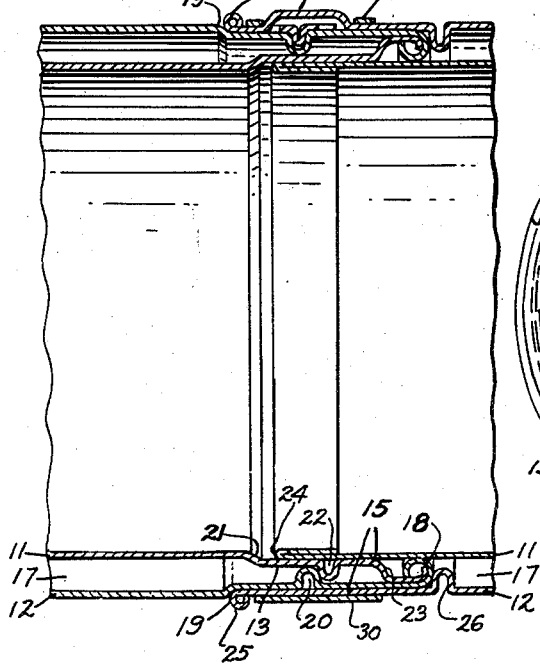
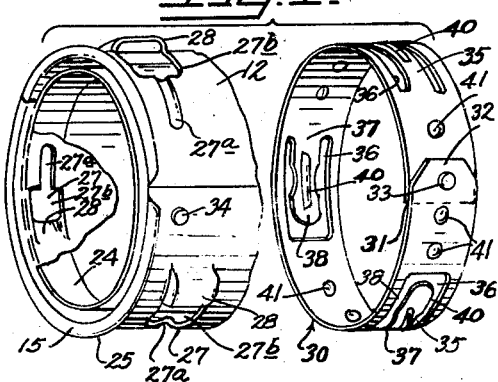
INVENTOR.
ALAN KINKEAD
BY
ATTORNEY

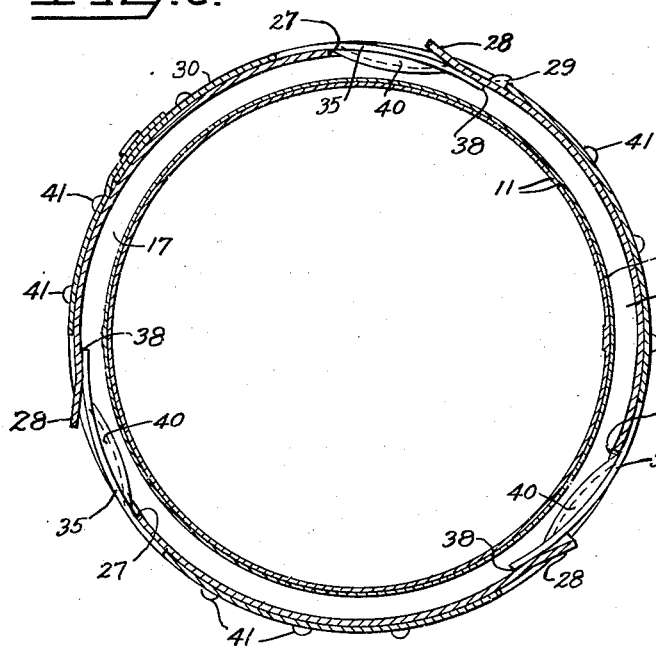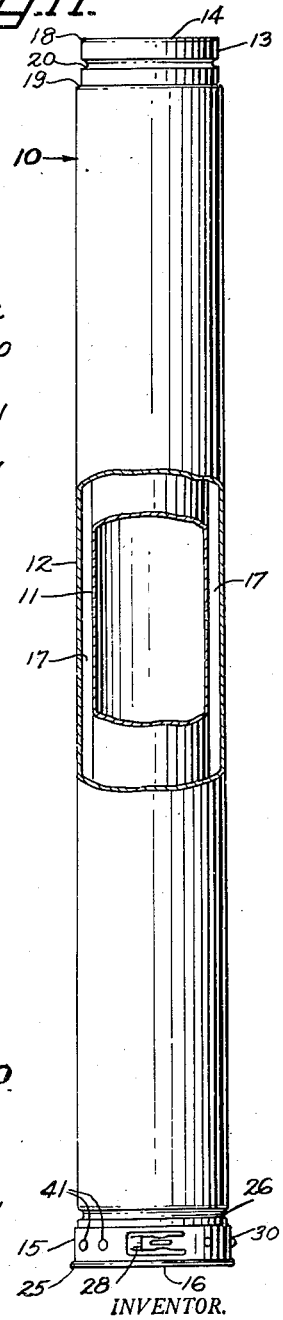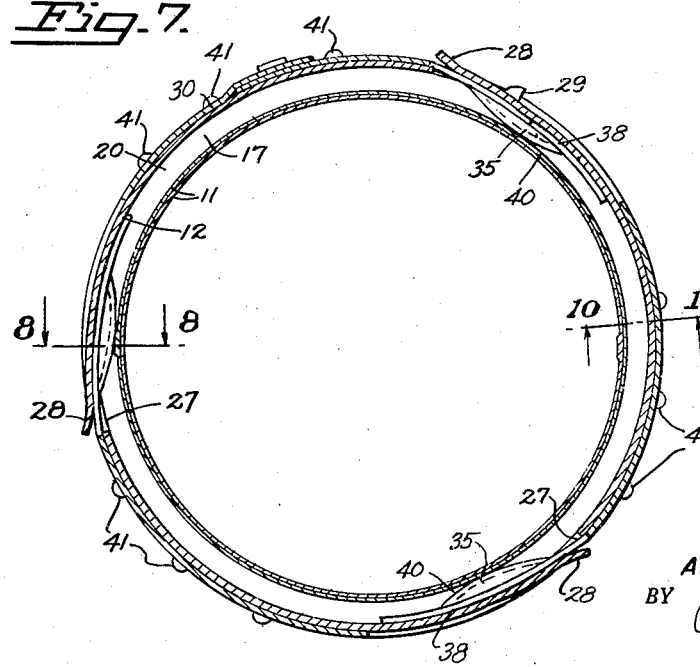

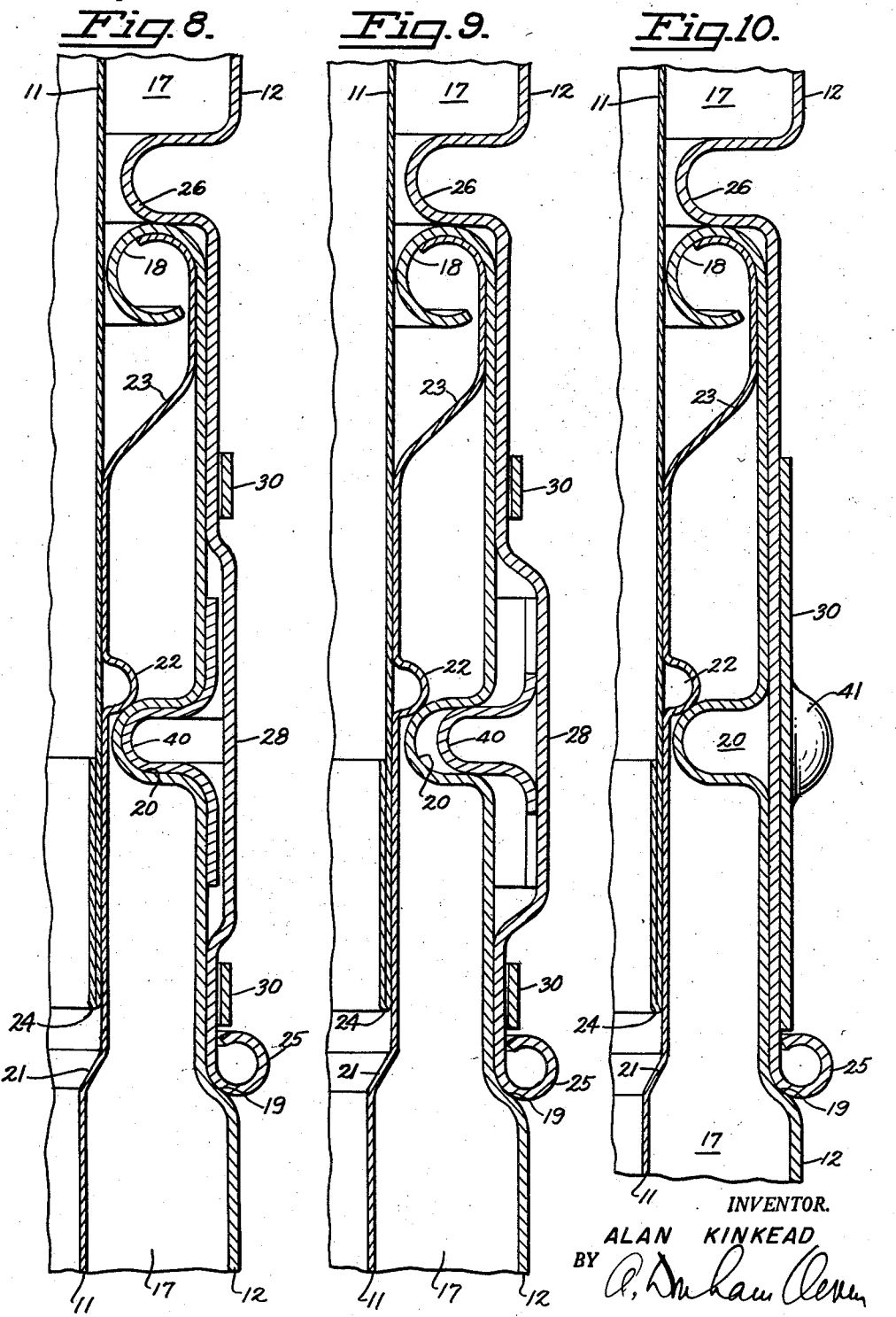

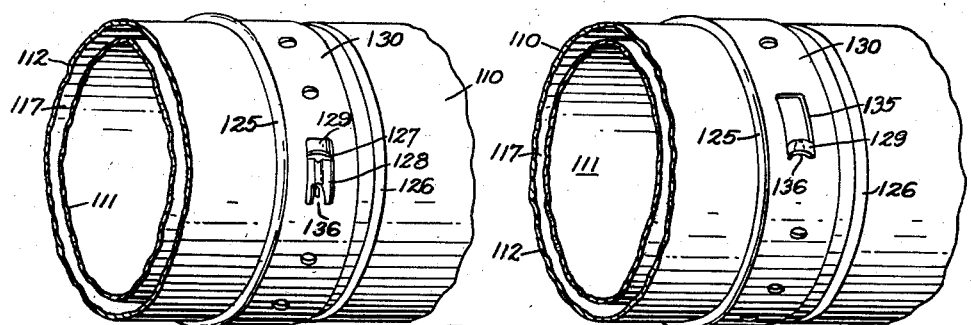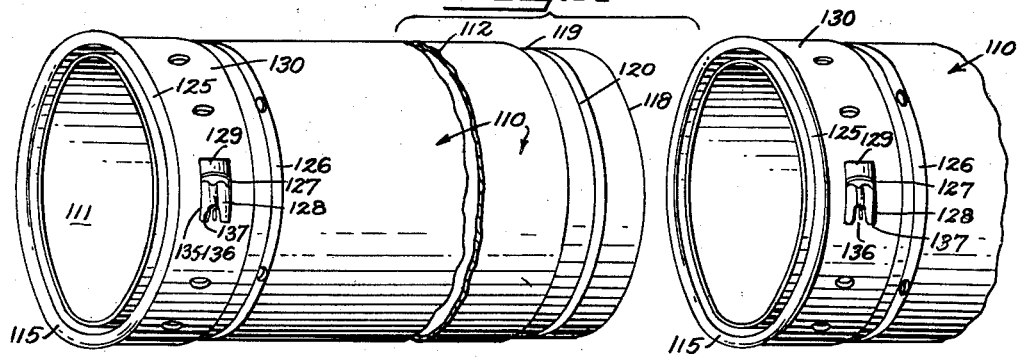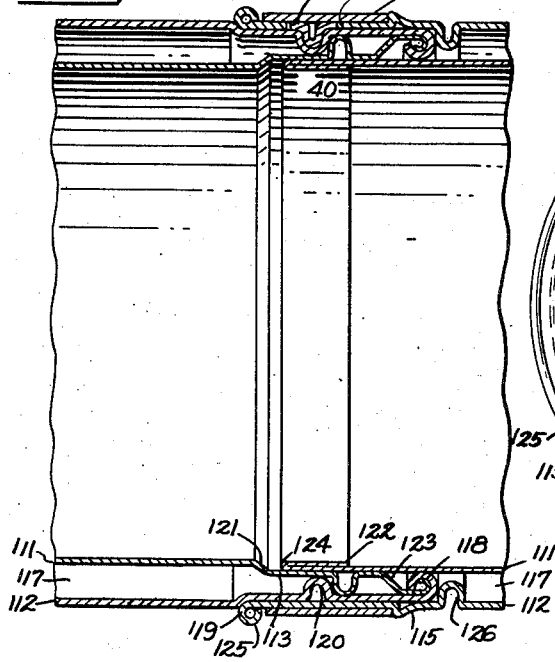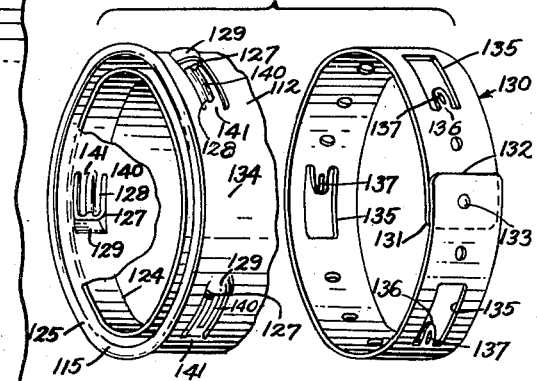

Sept. 9, 1958  A. KINKEAD  2,851,288
TELESCOPIC WALL FLUE CONNECTION WITH LOCKING RING
Filed Sept. 4, 1956  6 Sheets-Sheet 5
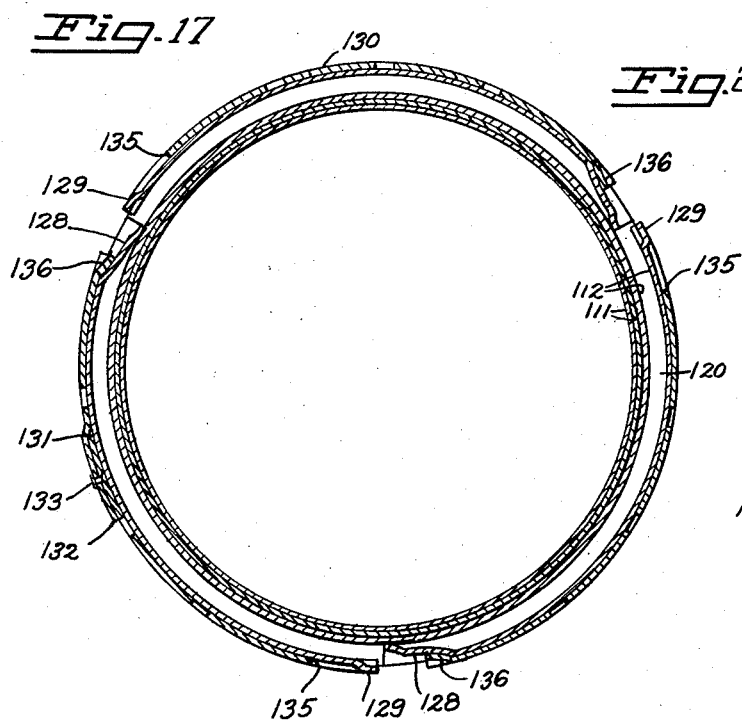
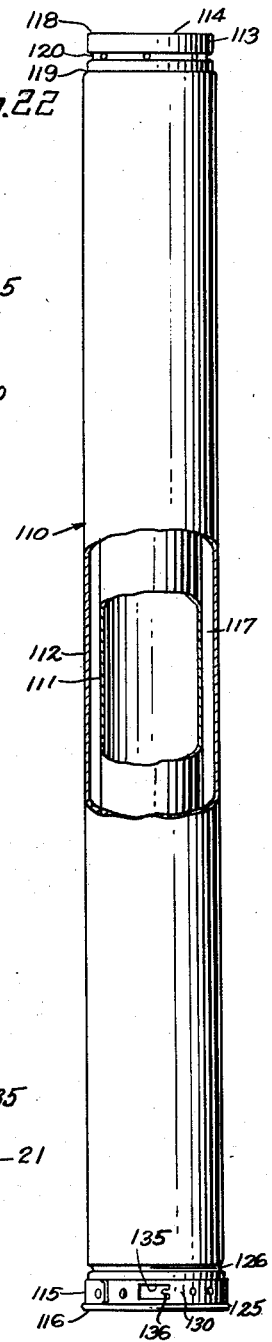
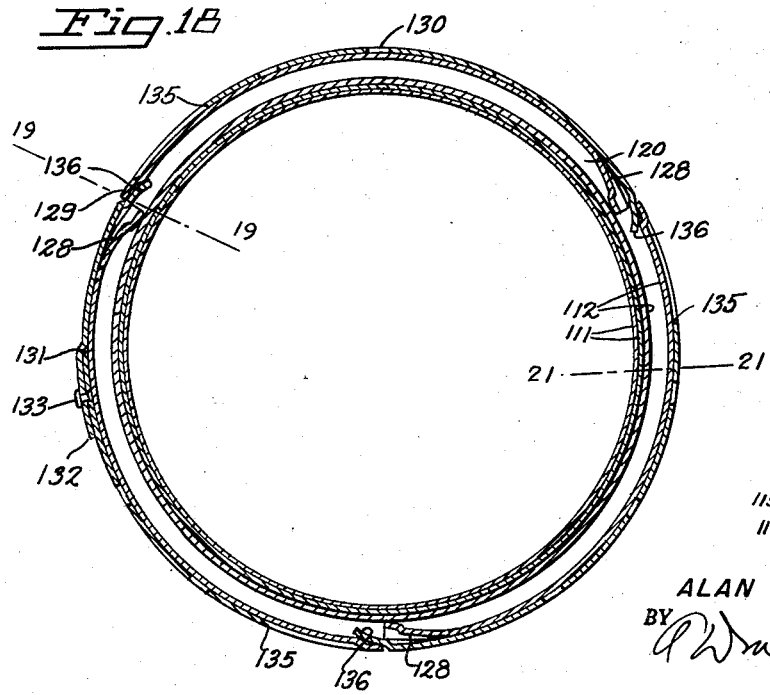
INVENTOR.
ALAN KINKEAD
ATTORNEY

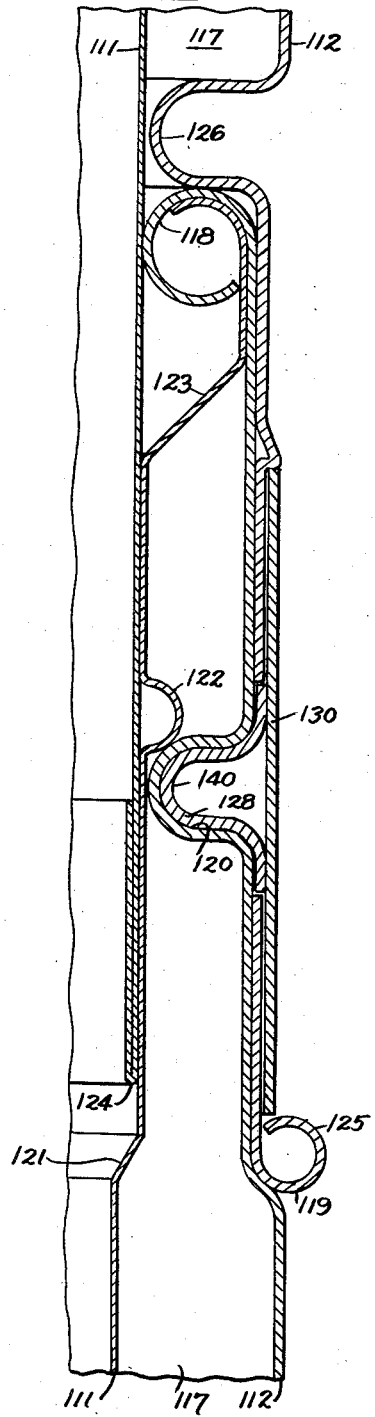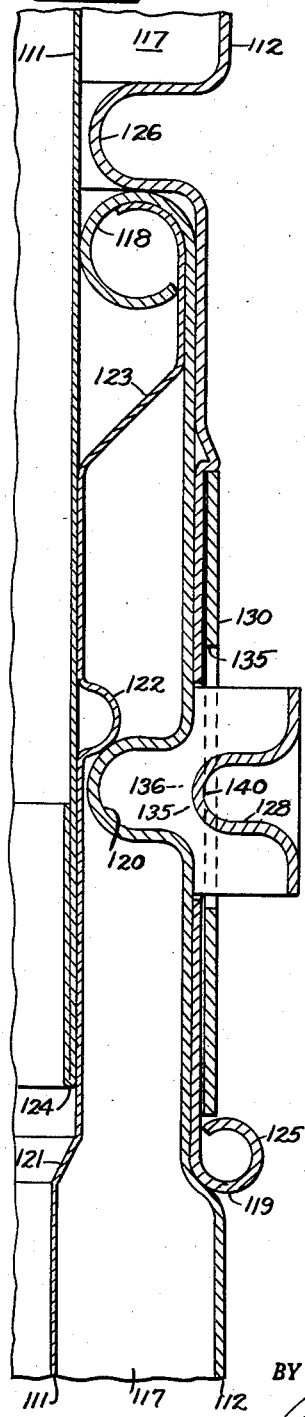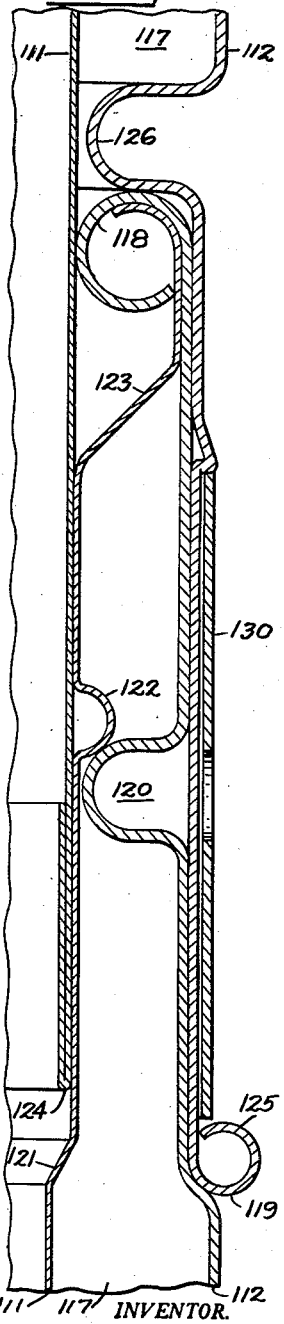

United States Patent Office 2,851,288
Patented Sept. 9, 1958

2,851,288

TELESCOPIC WALL FLUE CONNECTION WITH LOCKING RING

Alan Kinkead, Los Altos, Calif., assignor to William Wallace Company, Belmont, Calif., a corporation of California Application September 4, 1956, Serial No. 611,400

23 Claims. (Cl. 285—133)

This invention relates to improvements in pipe couplers, with applications to prefabricated double-walled metal flue or vent pipe, as well as to single-walled pipe. This application is a continuation-in-part of my earlier filed co-pending applications, Serial No. 530,436, filed August 25, 1955, now abandoned, and Serial No. 569,490, filed March 5, 1956, now abandoned.

Composite pipes, such as double-walled pipes, are widely used for flues, among other things, because they eliminate the fire hazard of hot flue pipes. The inner pipe, usually of aluminum, conducts the hot exhaust gases while the outer pipe, usually of galvanized iron, is spaced apart from the inner pipe and remains relatively cool at all times because of the air space between them. The aluminum pipe is relatively soft and easily injured and one of the advantages of the present invention is that in each section of pipe the aluminum inner pipe is secured to the stronger outer pipe at the male end, and at the female end it lies inside the curled end of the stronger outer pipe. This eliminates the chance for injury in handling and shipment.

When the pipe sections are assembled, any moisture of condensation which may form inside will run down the inner wall of one section and out the inner wall of the next section. Any rain or moisture on the outer wall of one section will pass over each joint and not into it. Moisture can thus shed itself all the way to the bottom of the connected string of pipe without getting into the joints at the couplings.

Certain other problems have arisen over the years in the use of the prior art metal vent pipe, such as (a) the time consumed by the installer in making the very difficult joint between sections which requires punching on the job and inserting metal screws; this is impossible on the inner pipe (the one carrying the hot gases) so it is left with an insecure slip joint; (b) the risk that some workmen will install the flue with the inner of the two pipes omitted; and (c) the lack of finished appearance of the pipe.

Prior art metal flue pipes (except my Patent 2,650,112) have in most instances required a sheet metal man equipped with special airplane type sheet metal snips, punches, crimpers, drills, hammer and screw driver to assemble a string of sections of pipe. Contrasted with this, the pipe of the present invention requires no cutting on the job, no punching of holes, no crimping, and can be completely installed by an inexperienced workman simply by rotating the locking band.

Another advantage of the present pipe is that should it ever become necessary to take it down and then reinstall it, the locking means makes this possible with certainty and speed.

The present invention has achieved many desirable objectives and has overcome many of the problems perplexing the industry. It is possible now to put out complete assembled plural-walled metal vent pipe sections which are tamper-proof and can be assembled quickly on the job with each section securely locked to its succeeding section.

The present invention provides a novel quick-coupling flue pipe structure incorporating a novel latching mechanism which operates in combination with male and female coupler elements formed integrally with each section of pipe at its ends. The pipe is installed with the female coupler end on the bottom of each pipe section, so that it becomes the upper coupling member at each joint and will shed any moisture running down the inside or the outside of the pipe. It receives the male end of the next lower section of pipe between its double walls, where a shoulder provides a stop and effects correct alignment between pipe sections. The pipe walls at the male end are brought together more closely than those at the female end and fit snugly into the latter. A shoulder is provided on the pipe wall at the male end to engage the end of the adjacent section. The male end also acts as a spacer to maintain the proper distance between the inner and outer pipes.

In this invention the outer wall at the male end of the pipe has a circumferential locking groove and the outer wall at the female end of the pipe has a circumferential series of perforations. The perforations and the locking groove align when the male and female ends of the pipe are assembled. One edge of each perforation is formed into a cammed guide lip which projects radially outwardly. A rotatable, metal locking band encircles the outer wall at the female end of the pipe. It has several spaced resilient locking tongues arranged so that each one will cooperate with one of the perforations and one of the cammed guide lips. When the locking band is rotated in the direction to lift the locking tongues out of the locking groove, each locking tongue rides up on the outer wall of the female end of the pipe far enough so that the tongues will not interfere with insertion or removal of the adjacent male end. When assembling the pipe, the male end is inserted and the locking band is rotated in the locking direction. This movement carries each locking tongue off the outer wall of the female end of the pipe, across the perforation and in under the cammed lip on the opposite edge of the perforation. Each cammed lip guides its cooperating locking tongue down until a crease therein (or in a tongue in the pipe's outer wall at the opposite end of the perforation from the cammed guide lip) engages in the lcoking groove in the male end of the pipe to lock the pipe sections together.

Besides this special applicability to double-walled pipe, the coupler described has utility as a coupler for single-walled pipe. However, the drawings and description of the embodiments concerned with double-walled pipe will mae clear its use in single-walled pipe also.

Other objects and advantages of the invention will appear from the following description of a preferred embodiment presented in accordance with 35 U. S. C. 112.

In the drawings:

Fig. 1 is a view in perspective showing one form coupler of the present invention in its locked position, the pipes having been broken off near the coupling to conserve space. While the pipe is here shown horizontally, it is normally erected and installed in a vertical position, as in Fig. 11, with the female end of the pipe at the bottom.

Fig. 2 is a view similar to Fig. 1 showing the pipe coupler joined but with the locking band in its unlocked position.

Fig. 3 is a view in perspective showing two pipes of the form of Figs. 1 and 2 held apart prior to their being joined together.

Fig. 4 is an exploded view in perspective of the two principal elements of the female end of the pipe of Fig. 1 with the locking strip to the right and with the outer wall of the pipe on which the locking strip is carried, shown to the left. A part of the inner pipe is broken away to show the underside of a cammed lip bordering one of the perforations.

Fig. 5 is an enlarged view in elevation and in longitudinal section of two sections of pipe as in Fig. 3 in coupled position.

Fig. 6 is a view on the same scale as Fig. 5 in diametric cross section showing the locking ring in its partially retracted position, corresponding approximately to Fig. 2.

Fig. 7 is a view similar to Fig. 6 showing the locking ring in its fully locked position, corresponding to Fig. 1, where it engages the locking groove and prevents retraction of the male coupler.

Fig. 8 is a greatly enlarged view in section taken along the line 8—8 in Fig. 7.

Fig. 9 is a view in section similar to Fig. 8, but with the locking ring being forced down by the cam lip into the locking groove in the male end.

Fig. 10 is a view in section similar to Figs. 8 and 9, taken along the line 10—10 in Fig. 7.

Fig. 11 is a view in elevation of a complete pipe section of the form of Fig. 1, with the central portion cut away and shown in section.

Fig. 12 is a view in perspective showing a modified form of the coupler of the present invention in its locked position, the pipes having been broken off near the coupling to conserve space. While the pipe is here shown horizontally, it is normally erected and installed in a vertical position, as in Fig. 11, with the female end of the pipe at the bottom.

Fig. 13 is a view similar to Fig. 12 showing the pipe coupler joined but with the locking band in its unlocked position.

Fig. 14 is a view in perspective showing two pipes like that in Fig. 12 held apart prior to their being joined together.

Fig. 15 is an exploded view in perspective of the two principal elements of the female end of the pipe of Fig. 12 with the locking strip to the right and with the outer wall of the pipe on which the locking strip is carried, shown to the left. A part of the inner pipe is broken away to show the underside of a cammed lip and its corresponding tongue.

Fig. 16 is an enlarged view in elevation and in longitudinal section of two sections of pipe as in Fig. 14 in coupled position.

Fig. 17 is a view on the same scale as Fig. 16 in diametric cross section showing the locking ring in its partially retracted position, corresponding approximately to Fig. 13.

Fig. 18 is a view similar to Fig. 17 showing the locking ring in its fully locked position, corresponding to Fig. 12 where its detent fully engages the crease of the tongue in the locking groove and prevents retraction of the male coupler.

Fig. 19 is a greatly enlarged view in section taken along the line 19—19 in Fig. 18.

Fig. 20 is a view in section similar to Fig. 19 but with the locking ring being forced down by the cam lip to engage the tongue in the locking groove in the male end.

Fig. 21 is a view in section similar to Figs. 19 and 20, taken along the line 21—21 in Fig. 18.

Fig. 22 is a view in elevation of a complete pipe section of the Fig. 12 type, with the central portion cut away and shown in section.

*The embodiment of figs. 1–11*

The embodiment of this invention illustrated in Figs. 1–11 contemplates a series of double-walled flue pipe sections 10 which can be joined together to make a flue pipe. Each section 10 comprises two coaxial, spaced-apart casings or pipes 11 and 12 formed with a male end 13, and a female end 15 at the other end. When assembled as a flue pipe the male end 13 is up and the female end is down as shown at 14 and 16 respectively in Fig. 11. The ends 13 and 15 are formed so they act as spacers to provide the insulating space 17 between the pipes 11 and 12, and there is no need for any additional spacing element. The pipes 11, 12 may be thin-walled seamed or unseamed pipe and may be made from aluminum, galvanized iron, or other suitable material.

The male end 13 is closed with a curled bead 18 that secures together the two spaced pipes 11 and 12. Between the bead 18 and a shoulder 19 on the outer wall the outer pipe 12 remains substantially cylindrical, except for the locking groove 20. This groove 20 is spaced down from the bead 18 so as to align with the perforations in the outer pipe 12 of an adjacent pipe section at its female end. In a typical piece of 4" pipe the groove 20 may be about ⅞ of an inch in from the bead 18 and about ⅝ of an inch from the shoulder 19.

The inner pipe 11 is stepped radially outwardly toward the outer pipe 12 at a shoulder 21 substantially in the plane of the shoulder 19 (see Figs. 8 to 10). The height of each shoulder 19 and 21 is governed by the radial spacing of the two walls 11 and 12 at the female end, and should be such as to make a tight cylindrical fit as shown in Figs. 8 to 10. Closely adjacent the locking groove 20, between it and the bead 18, the inner pipe 11 may have a groove 22 that functions as a spacer to hold the inner and outer pipes 11, 12 in proper axial relationship while the end bead 18 is being formed. Beyond the groove 22, the inner pipe 11 is flared outwardly at 23 so that it is flush with the wall of pipe 12 when the bead 18 is formed.

At the female end of the pipe section the inner pipe 11 retains its smooth cylindrical shape to its end, where the wall is folded back to form a thickened end 24 adapted to engage the shoulder 21 on the adjacent male section when assembled to form a flue pipe. The outer pipe 12 has a rolled or folded end edge 25 that engages the shoulder 19 on the adjacent male section. Preferably the outer pipe 12 has a circumferential groove 26 which forms a stop to engage the male end 18 of the adjacent section.

The outer pipe 12 of each pipe section at the female end is provided with a series of T-shaped perforations 27 spaced around the circumference. These perforations 27 are preferably punched out to provide a relatively long narrow portion 27a and a shorter wider portion 27b, both of which are spaced between the groove 26 and the ridge 19 so as to be centered over the locking groove 20 when the two pipes are coupled. The pipe wall at the far edge of each perforation portion 27b is bent outwardly to form a lip 28 (see Fig. 4), which may be approximately square and which tapers in smoothly to the normal circumference of the outer casing 12 thereby forming a cam. There may be several of these perforations 27, each with its cam lip 28, and by way of illustration, three of each are shown in the drawings. At the far side of one cam lip 28 a louver 29 is punched in through the pipe wall, to act as a stop for the band 30.

Cooperating with the perforations 27 and the cam lips 28 in the female end, and the locking groove 20 in an adjacent male end, is a locking band or ring 30. The locking band preferably is a metal strip rotatably mounted on the pipe wall 12. Its ends 31, 32 are secured together by a rivet 33 (see Fig. 4). To facilitate insertion of the rivet 33, the pipe 12 may be provided with an opening 34 to receive an anvil (not shown) for spreading the rivet.

The band 30 is perforated by a series of generally rectangular openings 36 to correspond to the perforations 27 in the pipe wall 12. When the band is perforated, enough metal is left to form a finger or locking tongue 35 with a central crease 40 that extends in radially and is adapted to be engaged in the groove 20. Each tongue 35 is centered in the perforation 36 and extends across most of its circumferential length. Each tongue is joined to the band 30 at 37 in a manner to give the tongue a resiliency so it will withdraw the crease 40 from the groove 20 when a portion of the crease 40 rides up on the wall of the outer pipe, as it moves out from under the cam 28. The end 38 of the tongue 35 feeds the latter in under the cam 28 which pushes the detent 40 down into the slot 20. The end 38 is preferably made of substantial length and is permanently locked in under the cam 28; this can be done during assembly, before the band 30 is riveted together; subsequently the louver 29 will hold the band in place, so that the band 30 cannot be turned far enough to disengage the fingers 35. Note, also, that the T-shaped perforations 27 keep the fingers 35 in alignment, and that the fingers are always partially engaged, so that they will not be bent out. To aid in rotating the band, portions of its wall are formed with outwardly projecting buttons 41.

*Installation of the device of Figs. 1–11*

In making an installation with sections of pipe of this invention, each section 10 is positioned so that the male end 13 faces upwardly and the female end 15 faces downwardly. The locking band 30 on the female end is rotated so the crease 40 is retracted from under the cam 28, and the portion of it lying on the smooth outer wall of the outer pipe 12, while the end 38 remains under the cam 28. (See the right-hand side of Fig. 3.) The male end 13 of another section of pipe may then be inserted in the female end until the rolled bead 18 of the male element 13 abuts the stop groove 26. This brings the outer rolled end 25 against the shoulder 19, the end of the hem 24 approaches the shoulder 21, leaving room for expansion, and the crease 40 snaps into the groove 20. However, at this time the crease 40 can be disengaged from the groove 20 merely by pulling it out. At this point the coupling is in the position shown in Figs. 2 and 10.

The next step is to rotate the locking band 30 to move the outer end 38 of the tongue 35 further in under the cammed lip 28. The detent or crease 40 is simultaneously guided radially inwardly by the cammed lip 28 as it rotates (see Figs. 6 and 9). As rotation continues, the locking crease 40 completely enters the locking groove 20 and becomes covered by the lip 28. Since the crease 40 then lies deep in the groove 20, it prevents any relative movement of the two pipe sections. (See Figs. 7 and 8.) The pipes can be unjoined by rotation of the locking band in the opposite direction to retract the crease 40, so that the pipe sections can then be pulled apart.

When the pipes are locked in this position, any moisture of condensation which may form on the inner wall 11 and flown down it will not flow into the coupling but will drop across the coupling, falling off the inner wall 11 of one section onto the inner wall 11 of the next section. The drop can continue in that manner down the full height of the stack of pipe.

*The embodiment of Figs. 12–22*

The modified embodiment of this invention illustrated in Figs. 12–22 also contemplates a series of double-walled flue pipe sections 110 (see Fig. 22) which can be joined together to make a flue pipe. Each section 110 comprises two coaxial, spaced-apart casings or pipes 111 and 112 formed with a male end 113, and a female end 115 at the other end. When assembled as a flue pipe the male end 113 is up and the female end is down as shown at 114 and 116 respectively in Fig. 22. The ends 113 and 115 are formed so they act as spacers to provide the insulating space 117 between the pipes 111 and 112, and there is no need for any additional spacing element. The pipes 111, 112 may be thin-walled seamed or unseamed pipe and may be made from aluminum, galvanized iron, or other suitable material.

The male end 113 is closed with a curled bead 118 that secures together the two spaced pipes 111 and 112. Between the bead 118 and a shoulder 119 on the outer wall the outer pipe 112 remains substantially cylindrical, except for the locking groove 120. This groove 120 is spaced down from the bead 118 so as to align with the perforations in the outer pipe 112 of an adjacent pipe section at its female end. In a typical piece of 4" pipe the groove 120 may be about ⅞ of an inch in from the bead 118 and about ⅝ of an inch from the shoulder 119.

The inner pipe 111 is stepped radially outwardly toward the outer pipe 112 at a shoulder 121 substantially in the plane of the shoulder 119 (see Figs. 19 to 21). The height of each shoulder 119 and 121 is governed by the radial spacing of the two walls 111 and 112 at the female end, and should be such as to make a tight cylindrical fit as shown in Figs. 19 to 21. Closely adjacent the locking groove 120, between it and the bead 118, the inner pipe 111 may have a groove 122 that functions as a spacer to hold the inner and outer pipes 111, 112 in proper axial relationship while the end bead 118 is being formed. Beyond the groove 122, the inner pipe 111 is flared outwardly at 123 so that it is flush with the wall of pipe 112 when the bead 118 is formed.

At the female end of the pipe section the inner pipe 111 retains its smooth cylindrical shape to its end, where the wall is folded back to form a thickened end 124 adapted to engage the shoulder 121 on the adjacent male section when assembled to form a flue pipe. The outer pipe 112 has a rolled or folded end edge 125 that engages the shoulder 119 on the adjacent male section. Preferably the outer pipe 112 has a circumferential groove 126 which forms a stop to engage the male end 118 of the adjacent section.

The outer pipe 112 of each pipe section at the female end is provided with a series of generally rectangular perforations 127 spaced around the circumference. Each of these perforations 127 is preferably punched so as to leave a long tongue 128 projecting from one end and spaced between the groove 126 and the ridge 119 so as to be centered over the locking groove 120 when two pipes are coupled. The pipe wall at the far edge of each perforation 127 is bent outwardly to form a lip 129 (see Fig. 15), which may be approximately square or rounded and which tapers in smoothly to the normal circumference of the outer casing 112 thereby forming a cam. There may be several of these perforations 127, each with its tongue 128 and cam lip 129, and by way of illustration three of each are shown in the drawings.

Cooperating with the tongue 128 and the cam lips 129 in the female end, and the locking groove 120 in an adjacent male end, is a locking band or ring 130. The locking band preferably is a metal strip rotatably mounted on the pipe wall 112. Its ends 131, 132 are secured together by a rivet 133 (see Fig. 15). To facilitate insertion of the rivet 133, the pipe 112 may be provided with an opening 134 to receive an avil (not shown) for spreading the rivet.

The band 130 is perforated by a series of generally rectangular openings 135 to correspond to the perforations 127 in the pipe wall 112. When the band is perforated, enough metal is left to form a short finger or locking detent 136 with a central crease 137 that extends in radially and is adapted to be engaged in a crease 140 in the tongue 128, which in turn is capable of being locked in the groove 120. Each tongue 128 is joined to the outer wall 112 at a base portion 141, in a manner to give the tongue 128 a resiliency so it will withdraw the crease 140 from the groove 120 when the detent 136 rides up on the base portion 141 after its end moves out from under the cam 129. But when the end of the detent 136 projects in under the cam 129, its crease 137 pushes the crease 140 of the tongue 128 down into the slot 120. To aid in rotating the band, portions of its wall are formed with outwardly projecting buttons 142.

*Installation of the device of Figs. 12–22*

In making an installation with sections of pipe of this form of the invention, each section 110 is positioned so that the male end 113 faces upwardly and the female end 115 faces downwardly. The locking band 130 on the female end is rotated so its detents 136 are retracted from under the cam 129 and lie on the base portion 41 of the tongues 128. (See Fig. 14.) The male end 113 of another section of pipe may then be inserted in the female end until the rolled bead 118 of the male element 113 abuts the stop groove 126. This brings the outer rolled end 125 against the shoulder 119, the end of the hem 124 approaches the shoulder 121, leaving room for expansion, and the crease 140 overlies and may snap into the groove 120. However, at this time the crease 140 can be disengaged from the groove 120 merely by pulling it out. At this point the coupling is in the position shown in Figs. 13 and 21.

The next step is to rotate the locking band 130 to move the detent 136 across the tongue 128, its crease 137 engaging the crease 140. As the detent 136 is moved further in under the cammed lip 129, the crease 140 is simultaneously guided radially inwardly by the transmission of the pressure of the cammed lip 129, through the detent 136. (See Figs. 17 and 20.) As rotation continues, the locking crease 140 completely enters the locking groove 120 and is held there firmly by the coaction of the detent 136 and the lip 129. Since the crease 140 then lies deep in the groove 120, it prevents any relative movement of the two pipe sections. (See Figs. 18 and 19.) The pipes can be unjoined by rotation of the locking band in the opposite direction to retract the crease 140, so that the pipe sections can then be pulled apart.

When the pipes are locked in this position, any moisture of condensation which may form on the inner wall 111 and flow down it, will not flow into the coupling but will drop across the coupling, falling off the inner wall 111 of one section onto the inner wall 111 of the next section. The drop can continue in that manner down the full height of the stack of pipe.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A composite sectional pipe construction adapted for connection with other like sectional pipe constructions, comprising pipe sections having a male coupler at one end of each section and a female coupler at the other end; and in which the male coupler has its pipe wall provided with an annular inset locking groove; said female coupler has its pipe wall provided with a series of perforations therearound adapted to overlie said locking groove when coupled and with a series of circumferentially in-line, outwardly flared cam lips at one side of each perforation; and a locking ring rotatably encircling said female coupler and having projecting tongues corresponding in number to said perforations, each tongue having a locking projection, whereby when a male and female coupler on adjacent sections of pipe are coupled together, said locking ring may be rotated to project said tongues into said perforations, as guided by said cam lips, and into engagement with said locking groove.

2. A composite sectional pipe construction adapted for connection with other like sectional pipe constructions, comprising pipe sections having a male coupler at one end of each section and a female coupler at the other end; and in which the male coupler has its pipe wall provided with an annular inset locking groove; said female coupler has its pipe wall provided with a series of perforations therearound adapted to overlie said locking groove when coupled, and a locking ring rotatably encircling said female coupler and having projecting fingers corresponding in number to said perforations, each finger having a locking projection, whereby when a male and female coupler on adjacent sections of pipe are coupled together, said locking ring may be rotated to project said finger into said perforations and into engagement with said locking groove.

3. The article of claim 2 in which said locking ring has its fingers formed by punching out a surrounding area.

4. The article of claim 3 in which said fingers are formed with a radial crease adapted to engage said groove and axial side portions adapted to engage said cam lips.

5. The article of claim 4 wherein each said finger is formed with an end portion projecting beyond said crease and under said cam lips, one of said cam lips being provided with a louver adapted to engage the edge of one said punched out area and prevent complete retraction of said fingers from said lips.

6. The article of claim 5 wherein each of said perforations is T-shaped, having a broad portion adjacent said cam lips, wider than said fingers, and a narrower guide portion wider than said crease.

7. A double-walled flue pipe in which each section has a male coupler at one end and a female coupler at the other end; said male coupler having its inner and outer pipes joined together at the end of the pipe, the outer pipe having a radially inset shoulder spaced from said end, the inner pipe having a radially outset shoulder approximately opposite said outer pipe shoulder, said outer pipe having an annular inset locking groove in between said shoulder and said end; said female coupler having its inner and outer pipe ends spaced apart to receive a male coupler of a corresponding section therebetween, its outer pipe being adapted to abut said male outer pipe shoulder and being inset radially at substantially the same distance from its end as said male outer pipe shoulder is from its end, to provide a shoulder against which the end of said male coupler abuts, when coupled, said female outer pipe having a series of perforations therearound adapted to overlie said locking groove when coupled and with a series of corresponding circumferentially in-line outwardly flared cam lips at one side of each perforation; a locking ring rotatably encircling said female coupler and having projecting members corresponding in number to said perforations, each member having a locking portion whereby when adjacent sections of pipe are coupled together, said locking ring may be rotated to project said members into engagement with said locking groove, and with the inner walls of the outer pipe of said female coupler.

8. Coupling for double-walled flue pipe sections, including in combination a male coupler at one end of each section and a female coupler at the other end; said male coupler having its inner and outer pipes joined together in a rolled joint at the end of the pipe, the outer pipe being radially inset from the remainder of the pipe wall at a shoulder spaced from said end, the inner pipe being radially outset from the remainder of the inner pipe wall at a shoulder approximately opposite said outer pipe shoulder, said outer pipe having an annular inset locking groove in between said shoulder and said end, said inner pipe having an annular stabilizing outset groove in contact with said locking groove; said female coupler having its inner and outer pipe ends spaced apart to receive a male coupler therebetween, its outer pipe ending in a rolled edge adapted to abut said male outer pipe shoulder and being inset radially at substantially the same distance from its end as said male outer pipe shoulder to provide a shoulder against which the end of said male coupler abuts, when coupled, said female outer pipe having a series of perforations therearound adapted to overlie said locking groove when coupled and with a series of circumferentially in-line outwardly flared cam lips at one side of each said perforation, the inner female pipe terminating in a rolled edge adapted to abut said male inner pipe shoulder; a locking ring rotatably encircling said female coupler and having a series of cut-out portions providing circumferentially extending projecting tongues corresponding in number to said perforations, each tongue being generally T-shaped in cross section, the vertical radial portion thereof adapted to engage said locking groove, the axial horizontal portion thereof adapted to engage the under surface of said cam lips, whereby when adjacent pipe sections are coupled together, said locking ring may be rotated to project said tongues into said perforations and, guided by said cam lips, into engagement with said locking groove.

9. The coupling of claim 8 wherein said locking ring is a strip wrapped around said female coupler outer wall and riveted together, a perforation being provided in said female coupler outer wall so that the rivet can be applied in situ.

10. A string of pipe sections as in claim 8 wherein the female coupler is on the lower end of each section and the male coupler is on the upper end of each section.

11. A composite sectional pipe construction adapted for connection with other like sectional pipe constructions to form a flue pipe, comprising double-walled flue pipe sections having a male coupler at one end of each section and a female coupler at the other end; and in which the male coupler has its outer pipe provided with an annular inset locking groove; said female coupler has its outer pipe provided with a series of perforations therearound adapted to overlie said locking groove when coupled and with a series of circumferentially in-line, outwardly flared cam lips at one side of each perforation; and a locking ring rotatably encircling said female coupler and having projecting detents corresponding in number to said perforations, each detent having a locking tongue, whereby when a male and female coupler on adjacent sections of pipe are coupled together, said locking ring may be rotated to project said detents into said perforations, as guided by said cam lips, and into engagement with said locking groove.

12. A composite sectional pipe construction adapted for connection with other like sectional pipe constructions to form a flue pipe, comprising double-walled flue pipe sections having a male coupler at one end of each section and a female coupler at the other end; and in which the male coupler has its outer pipe provided with an annular inset locking groove; said female coupler has its outer pipe provided with a series of perforations therearound adapted to overlie said locking groove when coupled, and a locking ring rotatably encircling said female coupler and having projecting detents corresponding in number to said perforations, each detent having a locking tongue, whereby when a male and female coupler on adjacent sections of pipe are coupled together, said locking ring may be rotated to project said detent into said perforations and into engagement with said locking groove.

13. A composite sectional pipe construction adapted for connection with other like sectional pipe constructions, comprising pipe sections having a male coupler at one end of each section and a female coupler at the other end; and in which the male coupler has its pipe wall provided with an annular inset locking groove; said female coupler has its pipe wall provided with a series of perforations therearound adapted to overlie said locking groove when coupled; a locking ring rotatably encircling said female coupler; projecting tongues on one of said female coupler and said locking ring, corresponding in number to said perforations, each tongue having a locking projection; and cam means on the other of said female coupler and said locking ring from said tongues, for guiding said tongues into said locking groove on rotation of said locking ring in one direction, whereby when a male and female coupler on adjacent sections of pipe are coupled together, rotation of said locking ring serves to project said tongues into said perforations, as guided by said cam means and into engagement with said locking groove.

14. A composite sectional pipe construction adapted for connection with other like sectional pipe constructions, comprising pipe sections having a male coupled at one end of each section and a female coupler at the other end; and in which the male coupler has its pipe wall provided with an annular inset locking groove; said female coupler has its pipe wall provided with a series of perforations therearound adapted to overlie said locking groove when coupled, a locking ring rotatably encircling said female coupler, and projecting fingers corresponding in number to said perforations, each finger having a locking projection, projected into and withdrawn from said locking groove by rotation of said locking ring, whereby when a male and female coupler coupler on adjacent sections of pipe are coupled together, said locking ring may be rotated to project said finger into said perforations and into engagement with said locking groove.

15. A composite sectional pipe construction adapted for connection with other like sectional pipe constructions, comprising pipe sections of the same diameter having a male coupler of said diameter at one end of each section and a female coupler of said diameter at the other end; and in which the male coupler has its pipe wall provided with an annular inset locking groove; said female coupler has its pipe wall cut to provide a series of perforations therearound adapted to overlie said locking groove when coupled and to provide a series of circumferentially in-line, projecting tongues extending into said perforations; and a collar movable in relation to said male and female members and having detents adapted to press said tongues into said groove to prevent relative movement between said pipe sections in both axial directions.

16. A composite sectional pipe construction adapted for connection with other like sectional pipe constructions, comprising pipe sections having a male coupler at one end of each section and a female coupler at the other end; and in which the male coupler has its pipe wall provided with an annular inset locking groove; said female coupler has its pipe wall provided with a series of perforations therearound adapted to overlie said locking groove when coupled, projecting fingers corresponding in number to and positioned adjacent said perforations, each finger having a locking projection, and a locking ring rotatably encircling said female coupler and adapted on rotation to project said fingers into said groove, whereby when a male and female coupler on adjacent sections of pipe are coupled together, said locking ring may be rotated to project said finger into said perforations and into engagement with said locking groove.

17. A composite sectional pipe construction adapted for connection with other like sectional pipe constructions, comprising pipe sections each having a male coupler at one end and a female coupler at the other end, said male coupler having its pipe wall provided with an annular inset locking groove, said female coupler having its pipe wall provided with a circumferential series of perforations therearound adapted to overlie said locking groove when coupled, a series of circumferentially in-line, outwardly flared cam lips, one at one end of each said perforation, and a series of creased locking tongues, one projecting into each said perforation from the other end, and a locking ring rotatably encircling said female coupler and having projecting detents corresponding in number to said perforations, each detent having a crease adapted to engage in said tongue creases, whereby when a male and female coupler on adjacent sections of pipe are coupled together, said locking ring may be rotated to project said detents against said tongues with their creases engaged, and as guided by said cam lips, to press said tongue creases into engagement with said locking groove.

18. A composite sectional pipe construction adapted for connection with other like sectional pipe constructions, comprising pipe sections having a male coupler at one end of each section and a female coupler at the other end, said male coupler having its pipe wall provided with an annular inset locking groove, said female coupler having its pipe wall partially cut out to provide a circumferential series of locking tongues therearound adapted to overlie said locking groove when coupled, and a locking ring rotatably encircling said female coupler and having projecting detents corresponding in number to said tongues, whereby when a male and female coupler on adjacent sections of pipe are coupled together, said locking ring may be rotated to project said detents radially inwardly upon said tongues to force said tongues into engagement with said locking groove.

19. The article of claim 18 in which said locking ring has its detents formed by punching out a surrounding area and in which said detents and said tongues are each formed with radial creases, the creases of said detents being adapted to engage those of said tongues, which in turn are adapted to engage said groove, said detents also being adapted to engage cam lips formed in said female coupler pipe wall opposite each said tongue.

20. A double-walled flue pipe in which each section has a male coupler at one end and a female coupler at the other end; said male coupler having its inner and outer pipes joined together at the end of the pipe, the outer pipe having a radially inset shoulder spaced from said end, the inner pipe having a radially outset shoulder approximately opposite said outer pipe shoulder, said outer pipe having an annular inset locking groove in between said shoulder and said end; said female coupler having its inner and outer pipe ends spaced apart to receive a male coupler of a corresponding section therebetween, its outer pipe being adapted to abut said male outer pipe shoulder and being inset radially at substantially the same distance from its end as said male outer pipe shoulder is from its end, to provide a shoulder against which the end of said male coupler abuts, when coupled, said female outer pipe having a circumferential series of perforations therearound adapted to overlie said locking groove when coupled, with a series of projecting tongues extending from one end of each perforation, each tongue having a locking portion adapted to engage in said groove when forced therein, but normally urged, by the natural spring action of said tongues, radially out from said groove, and with a series of corresponding circumferentially in-line outwardly flared cam lips at the other end of each perforation; a locking ring rotatably encircling said female coupler and having projecting members corresponding in number to said perforations, each member having a radially inwardly extending portion whereby when adjacent sections of pipe are coupled together, said locking ring may be rotated to project said members into engagement with said tongues and to force said tongue locking portions into engagement with said locking groove, and with the inner walls of the outer pipe of said female coupler.

21. Coupling for double-walled flue pipe sections, including in combination a male coupler at one end of each section and a female coupler at the other end; said male coupler having its inner and outer pipes joined together in a rolled joint at the end of the pipe, the outer pipe being radially inset from the remainder of the pipe wall at a shoulder spaced from said end, the inner pipe being radially outset from the remainder of the inner pipe wall at a shoulder approximately opposite said outer pipe shoulder, said outer pipe having an annular inset locking groove in between said shoulder and said end, said inner pipe having an annular stabilizing outset groove in contact with said locking groove; said female coupler having its inner and outer pipe ends spaced apart to receive a male coupler therebetween, its outer pipe ending in a rolled edge adapted to abut said male outer pipe shoulder and being inset radially at substantially the same distance from its end as said male outer pipe shoulder to provide a shoulder against which the end of said male coupler abuts, when coupled, said female outer pipe having a series of perforations therearound adapted to overlie said locking groove when coupled and with a series of circumferentially in-line outwardly flared cam lips at one side of each said perforation, and a series of circumferentially in-line tongues, at the other side of each said perforation, each tongue having a creased portion of a size suitable for engagement in said locking groove and normally overlying said groove when coupled, but normally urged away therefrom by said tongue, the inner female pipe terminating in a rolled edge adapted to abut said male inner pipe shoulder; a locking ring rotatably encircling said female coupler and having a series of cut-out portions providing circumferentially extending projecting detents corresponding in number to said perforations, each tongue being short relative to said cut-out portions and provided with creases each having a vertical radial portion adapted to engage said tongue creased portion and urge it radially inwardly, and an axial horizontal portion adapted to engage the under surface of said cam lips, whereby when adjacent pipe sections are coupled together, said locking ring may be rotated to project said detents into said tongues and, guided by said cam lips, to force said tongue creased portions into engagement with said locking groove.

22. A composite sectional pipe construction adapted for connection with other like sectional pipe constructions to form a flue pipe, comprising double-walled flue pipe sections having a male coupler at one end of each section and a female coupler at the other end; and in which the male coupler has its outer pipe provided with an annular inset locking groove; said female coupler has its outer pipe provided with a series of perforations therearound adapted to overlie said locking groove when coupled and with a series of circumferentially in-line normally radially outwardly urged tongues at one side of each perforation, each tongue having a vertical radial portion; and a locking ring rotatably encircling said female coupler and having projecting detents corresponding in number to said perforations, each detent having a tongue-engaging radially inwardly extending portion, whereby when a male and female coupler on adjacent sections of pipe are coupled together, said locking ring may be rotated to project said detents into said tongues, as guided by said cam lips, and thereby to project said tongues into engagement with said locking groove.

23. A composite sectional pipe construction adapted for connection with other like sectional pipe constructions to form a flue pipe, comprising double-walled flue pipe sections having a male coupler at one end of each section and a female coupler at the other end; and in which the male coupler has its outer pipe provided with an annular inset locking groove; said female coupler has its outer pipe wall partially cut out to provide a circumferential series of projecting tongues therearound each adapted to overlie a said locking groove, when coupled, with a vertical radial portion, and a locking ring rotatably encircling said female coupler and having projecting detents corresponding in number to said tongues, each detent having a vertical radial portion, whereby when a male and female coupler on adjacent sections of pipe are coupled together, said locking ring may be rotated to project said detents' radial portions into said tongues so as to force the vertical radial portions of said tongues into engagement with said locking groove.

References Cited in the file of this patent
UNITED STATES PATENTS

| | | |
|---|---|---|
| 1,533,875 | McCleary | Apr. 14, 1925 |
| 2,650,112 | Kinkead | Aug. 25, 1953 |